US006948705B2

(12) United States Patent
Lee et al.

(10) Patent No.: US 6,948,705 B2
(45) Date of Patent: Sep. 27, 2005

(54) GAS/LIQUID CONTACTING APPARATUS

(75) Inventors: Adam T. Lee, Dallas, TX (US); Larry W. Burton, Desoto, TX (US); Francis W. Lemon, Ottawa (CA)

(73) Assignee: AMT International, Inc., Richardson, TX (US)

( * ) Notice: Subject to any disclaimer, the term of this patent is extended or adjusted under 35 U.S.C. 154(b) by 31 days.

(21) Appl. No.: 10/679,471

(22) Filed: Oct. 7, 2003

(65) Prior Publication Data

US 2005/0073063 A1 Apr. 7, 2005

(51) Int. Cl.$^7$ ................................................. B01F 3/04
(52) U.S. Cl. ........................ 261/79.2; 261/96; 261/109
(58) Field of Search ........................... 261/79.2, 96, 98, 261/102, 105, 109

(56) References Cited

U.S. PATENT DOCUMENTS

| | | | |
|---|---|---|---|
| 2,005,316 A | | 6/1935 | Hall .............................. 196/139 |
| 3,022,054 A | * | 2/1962 | Kotzebue ................. 261/114.4 |
| 3,022,316 A | | 2/1962 | Kotzebue .................... 261/114 |
| 4,514,377 A | | 4/1985 | Symons et al. .............. 423/648 |
| 4,770,747 A | * | 9/1988 | Muller ......................... 202/176 |
| 4,927,606 A | * | 5/1990 | Cetinkaya et al. ........... 422/144 |
| 5,106,544 A | * | 4/1992 | Lee et al. ................... 261/79.2 |
| 5,516,465 A | * | 5/1996 | Yeoman ..................... 261/79.2 |
| 5,605,654 A | * | 2/1997 | Hsieh et al. ................ 261/79.2 |
| 5,632,933 A | * | 5/1997 | Yeoman et al. ............. 261/109 |
| 5,895,608 A | | 4/1999 | Lee et al. ................. 261/114.1 |
| 6,488,899 B1 | * | 12/2002 | Gohara et al. .............. 422/171 |

FOREIGN PATENT DOCUMENTS

FR     2 827 791    *   1/2003

* cited by examiner

*Primary Examiner*—Scott Bushey

(57) ABSTRACT

The lower, liquid collecting section of a gas/liquid contacting column has an entrained substance depleting duct extending therearound wherein gas, for example, steam is fed by the duct into the lower section, steam depleted by gravity of liquid droplets, is deflected upwardly by deflectors in the duct through duct openings into a central, upper region of the lower section, while steam with the droplets is deflected downwardly by deflectors in the duct through other duct openings towards a liquid pool in the lower section. Any other liquid and/or solids entrained in the gas (steam) are also deflected downwardly in this manner.

9 Claims, 4 Drawing Sheets

_US 6,948,705 B2_

GAS/LIQUID CONTACTING APPARATUS

FIELD OF THE INVENTION

This invention to a gas/liquid contacting apparatus.

BACKGROUND OF THE INVENTION

There are various types of gas/liquid contacting apparatus wherein liquid passing downwardly through casing is contacted therein by gas passing upwardly through perforated trays which partition the casing at different levels.

In one type of gas/liquid contacting apparatus the liquid flows across the trays and is frothed thereon by gas permeating the tray perforations, see, for example, U.S. Pat. Nos. 2,005,316, dated Jun. 18, 1935, F. N. Hall, U.S. Pat. No. 3,022,054, dated Feb. 20, 1962, M. H. Kotzebue, and U.S. Pat. No. 5,895,608, dated Apr. 20,1999, A. T. Lee, K. Wu and L. Burton.

In another type of gas/liquid contacting apparatus ordered or randomly distributed packing elements of packed beds are supported by the trays. These beds increase the surface contact area between gas and liquid in the apparatus. The packed beds may be catalyst packed beds, see, for example, U.S. Pat. No. 4,514,377, dated Apr. 30, 1985.

There is a problem with a gas/liquid contacting apparatus in that liquid droplets and/or solids entrained in gas fed to the apparatus, particularly when the gas is at a high velocity, can prevent effective passage of gas upwardly through, for example, tray perforations and packings, and have other detrimental effects on the gas/liquid contact, see, for example, column 1, line 66, to column 2, line 12, of U.S. Pat. No. 5,895,608, referred to above. The liquid droplets and/or solids may be in the form of water or other liquids in steam or other gases, and solid contaminants in particulate form entrained in steam or other gases.

U.S. Pat. No. 5,895,608, dated Apr. 20, 1999, FIG. 1, shows a vapor feed line or reboiler return line, designated 32, which has a downwardly facing, vapor outlet which will, to a limited extent, deposit liquid droplets entrained in the vapor into liquid therebelow. However, no steam/entrained liquid droplets separation takes place in the vapor feed line, with entrained substance depleted steam exiting the feed line by a different outlet than the separated droplets, and so a significant amount of liquid droplets remains entrained in the steam which passes upwardly from the feed line.

There is a need for a gas/liquid contacting apparatus wherein an entrained substance separator, gas distributor, is provided in a lower, liquid collecting section thereof, which will, i) separate a significant amount of entrained substances from the gas steam, ii) provide different exits for the entrained substance depleted gas exiting from the distributor than those for separated, gas entrained substances exiting therefrom, and iii) distribute the gas more evenly in the lower, liquid collecting section.

SUMMARY OF THE INVENTION

According to the present invention there is provided a gas/liquid contacting apparatus, comprising, a) an upwardly extending column having an interior comprising, an upper section, a gas/liquid permeable, gas/liquid contacting, intermediate section, and a lower, liquid collecting section, b) liquid inlet means to, and gas outlet means from, the upper section, c) liquid outlet means from, and gas inlet means to, the lower section, and d) an entrained substance depleting, gas distributing assembly in the lower section, the assembly comprising, i) a gas conveying duct connected to the gas inlet and having an interior that decreases in cross section downstream from the gas inlet, the duct extending around at least a major portion of the lower section, and having entrained substance depleted gas outlets, at spaced positions therealong, from inner, upwardly extending wall portions thereof, and entrained substance concentrate gas outlets, at spaced positions therealong, from inner, downwardly extending lower wall portions thereof, and ii) for each entrained substance depleted gas outlet, a gas deflector for directing gas flow from that gas outlet inwardly and upwardly in the lower section, and iii) for each entrained substance concentrate gas outlet an entrained substance concentrate gas deflector for directing entrained substance concentrate gas flowing from that entrained substance concentrate gas outlet towards a lower portion of the lower section.

The entrained substance concentrate gas outlets may be spaced along the duct at positions between the gas outlets.

The gas conveying duct may be divided into two lengthwise extending portions by being connected at an intermediate position therealong to the gas inlet, with the duct interior decreasing in cross-section in both duct portions downstream from the gas inlet, and the entrained substance depleting, gas distributing assembly may further comprise a flow splitter for splitting the flow of gas entering the duct into gas streams for both duct portions.

The gas conveying duct may comprise a base wall extending inwardly from, and around at least a portion of an inner side of the column, a top wall spaced above the base wall and extending inwardly from, and around, the inner side of the column, with the inner, upwardly extending wall portion inclining downwardly from an inner edge of the top wall, towards the center of the lower section, and the inner, downward extending wall portion inclining upwardly from the level of the base to a lower edge of the inner, upwardly extending wall portion.

The inner, upwardly extending wall portion may comprise a series of plates with inverted V-shaped gas outlets between adjacent plates forming the entrained substance depleted gas outlets, and the inner, downwardly extending wall portion comprises a series of plates with V-shaped gaps between adjacent plates forming the entrained substance concentrate gas outlets.

Each entrained substance depleted gas deflector may comprise an upwardly extending triangular plate joined by an upper sloping side to an upstream side of an inner, upwardly extending wall portion, and by a lower, sloping side to a downstream side of an inner, downwardly extending wall portions, and each entrained substance concentrate gas deflector may comprise a downwardly extending triangular plate joined by an upper sloping side to a downstream side of an inner, upwardly extending wall portion and by a lower sloping side wall to an upstream side of an inner, downwardly extending wall portions.

The entrained substance depleted gas deflectors and the entrained substance concentrate gas deflectors may be curved to sweep entrained substance depleted gas or entrained substance concentrate gas towards their respective outlets.

The duct may extend along a circular path.

Preferably, the entrained substance depleted gas outlets and the entrained substance concentrate gas outlets are gas flow constricting gas outlets.

In this patent specification, entrained substances means any entrained substances, in liquid and/or solid form, entrained in a gaseous stream which may comprise one or more gases and/or liquids in vapor form.

BRIEF DESCRIPTION OF THE DRAWINGS

In the accompanying drawings which illustrate, by way of example, embodiments of the present invention.

DETAILED DESCRIPTION OF THE PREFERRED EMBODIMENTS

Figure 1:
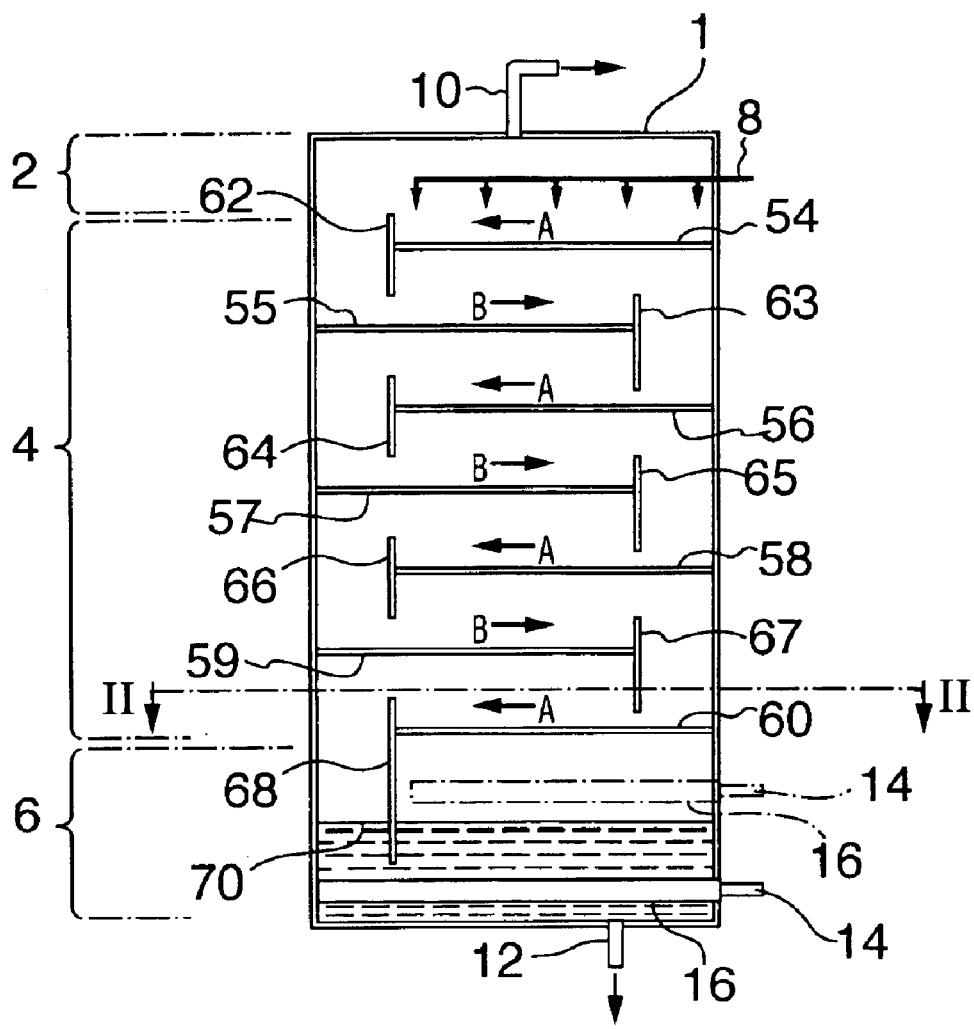
FIG. 1 in a schematic side view of a gas/liquid contacting apparatus.
Figure 2:
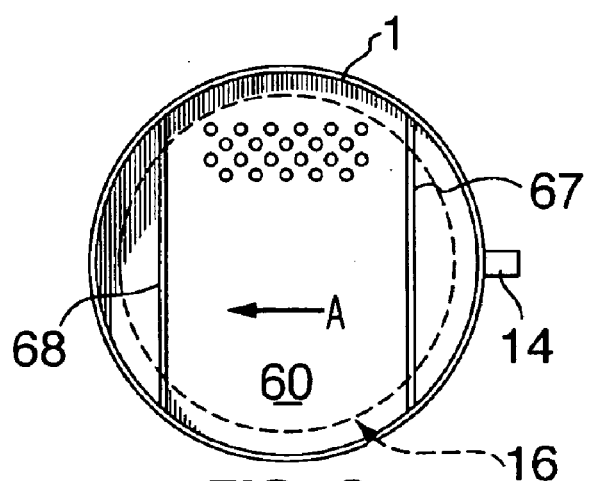
FIG. 2 is a sectional plan view along II—II, FIG. 1.
Figure 3:
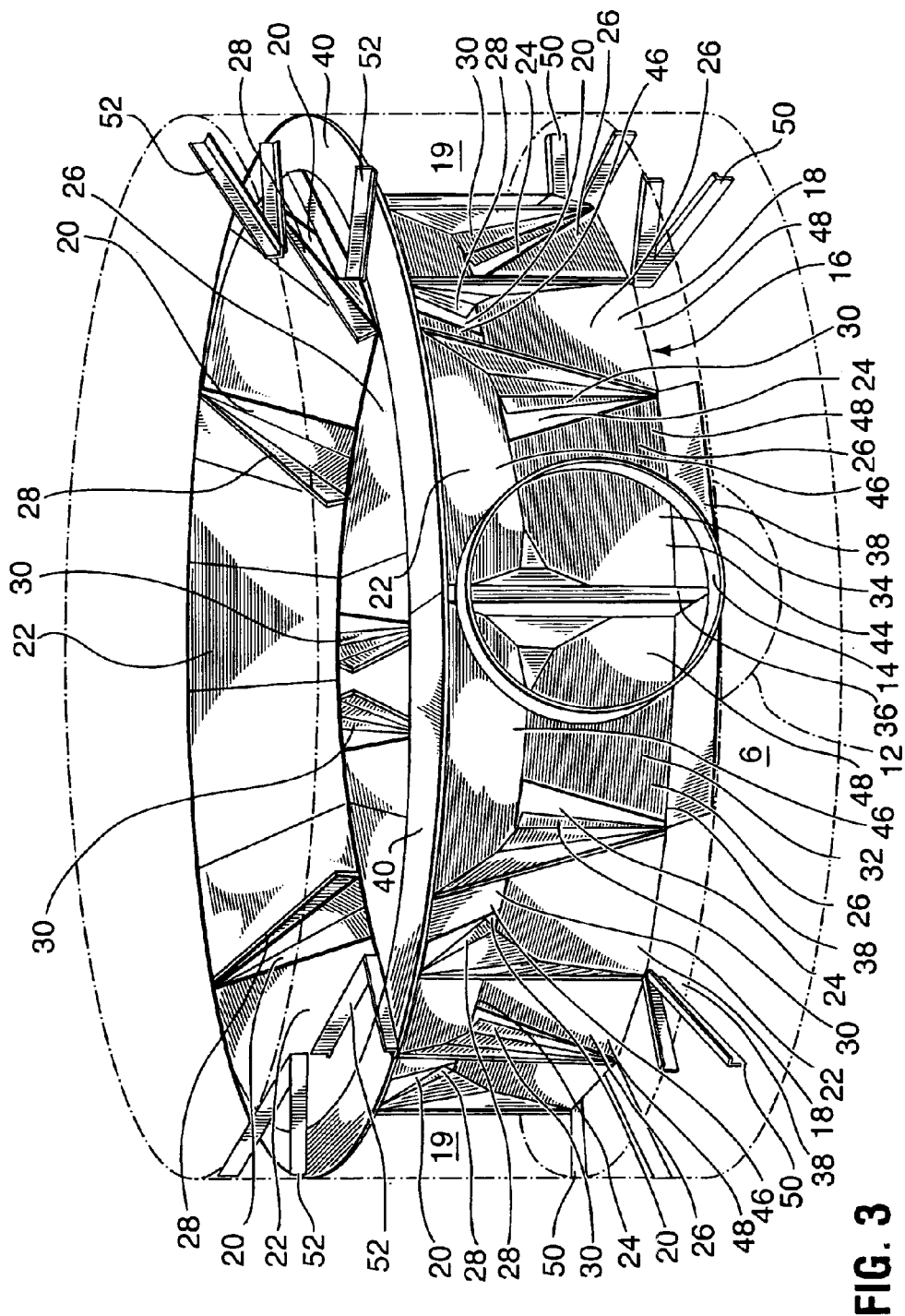
FIG. 3 is a perspective view of an entrained substance depleting, gas distributing means in the apparatus shown in FIGS. 1 and 2.

In FIG. 1 to 3, there is shown a gas/liquid contacting apparatus, which may be, for example, a hydrocarbon fractionating apparatus, comprising, a) an upwardly extending column 1 having an interior comprising, an upper section 2, a gas/liquid permeable, gas/liquid contacting, intermediate section 4, and a lower, liquid collecting section 6, b) liquid inlet means 8 to, and gas outlet means 10 from, the upper section 2, c) liquid outlet means 12 from, and gas inlet means 14 to, the lower section 6, and d) an entrained substance depleting, gas distributing assembly, generally designated 16, in the lower section 6, the assembly 16 comprising, i) a gas conveying duct 18 (FIG. 3) connected to the gas inlet 14, and having an interior 19 that decreases in cross sectional area downstream from the gas inlet 14, the duct 18 extending around at least a major portion of the lower section 6, and having entrained substance depleted gas outlets 20, at spaced positions therealong, from inner, upwardly extending wall portions 22, thereof, and entrained substance concentrate gas outlets 24, at spaced positions therealong, from inner, downwardly extending wall portions 26, thereof, and ii) for each entrained substance depleted gas outlet 20, an entrained substance depleted gas deflector 28 for directing gas flow from that gas outlet 20 inwardly and upwardly in the lower section 6, and iii) for each entrained substance concentrate gas outlet 24 an entrained substance concentrate gas deflector 30 for directing entrained substance concentrate gas flowing from that entrained substance concentrate gas outlet inwardly and downwardly in the lower section 6.

The entrained substance concentrate gas outlets 24 are spaced along the ducting 18 at positions between the entrained substance depleted gas outlets 20.

In this embodiment of the present invention, the duct 18 is divided into two lengthwise extending portions 32 and 34 by being connected at an intermediate position therealong to the gas inlet 14. The duct interior 19, decreases in cross-sectional area in both downstream directions, that is in both duct portions 32 and 34, from the gas inlet 14, and the entrained substance depleting, gas distributing assembly 16 further comprises a flow splitter 36 for splitting the flow of gas entering the duct 18 into gas streams for both directions, that is into both casing portions 32 and 34.

As will be seen from FIG. 3, the duct 18 comprises a base wall 38 extending inwardly from, and around a portion of an inner side of the column 1, a top wall 40 spaced above the base wall 38 and extending inwardly from, and around, the inner side of the column 1, with the inner, upwardly extending wall portion 22 inclined downwardly from an inner edge of the top wall 40, towards the center of the lower section 6, and with the inner, downwardly extending wall portion 26 inclined upwardly from the level of an inner edge of the base wall 38 to a lower edge of the inner, upwardly extending wall 22.

The inner, upwardly extending wall portion 22 comprises a series of plates, such as those designated 46, with the first two, joined to the flow splitter 36 and from that position inverted V-shaped gaps are provided between adjacent plates 46 as the entrained substance depleted gas outlets 20.

The inner, downwardly extending wall portion 26 comprises a series of plates, such as those designated 48, with the first two joined to the flow splitter 36 and from that position V-shaped gaps and provided between adjacent plates 48 as the entrained substance concentrate gas outlets 24.

The gas deflectors 28 each comprise upwardly extending triangular plates joined by an upper sloping side to an upstream side of the plates 46 and by a lower sloping side to a downstream side of the plates 48.

The entrained substance concentrate gas deflectors 30 each comprise downwardly extending triangular plates joined by an upper sloping side to a downstream side of the plates 46 and by a lower sloping side to an upstream side of the plates 48.

The gas deflectors 28 and the entrained substance concentrate gas deflectors 30 are curved, in this instance with a series of bends, to sweep gas or entrained substance towards their respective outlets 20 and 24.

The entrained substance depleting and gas distributing assembly 16 is attached to the column 1 by brackets 50 and 52.

In this embodiment of the present invention, the permeable, gas/liquid contacting, intermediate section (FIGS. 1 and 2) comprises a series of perforated trays 54 and 60, and downcorners 62 to 68.

In operation, liquid is distributed over the top tray and descends to collect in the lower section 6, and exit therefrom by liquid outlet means 12, while gas is fed into the column 1 by gas inlet means 14 and ascends in the column 1 to exit therefrom by gas outlet 10.

The liquid descends in the column 1 by flowing across the trays 54 and 60 in the directions of arrows A and B, while the downcorners 62 and 68 maintain a level of liquid on the trays 54 to 60 and form liquid seals so that ascending gas passes upwardly through the perforated trays 54 to 60.

The gas passing up through the perforated trays 54 to 60 froths the liquid flowing across the trays 54 to 60 and in this manner is brought into intimate contact with the liquid.

Liquid exiting from the column 1 forms a pool 70 (FIG. 1) in the lower, liquid collecting section 6, which forms a liquid seal with the downcorner 68.

The apparatus shown in FIG. 1 may be used, for example, as a fractionating column, or a distillation column wherein oil is the liquid fed to the liquid inlet means 8 and steam is the gas fed to gas inlet means 14. The steam fed to the gas inlet means 14 usually contains entrained water droplets, and may contain other entrained substances in liquid or solid form. These entrained substances reduce the efficiency of the column by blocking and/or reducing the effective areas of tray perforations, and reducing contact between the liquid and the gas. This is an even greater problem when bubble caps (not shown) are provided over the tray perforations.

With the present invention, steam fed to the liquid inlet means 8 is split by the flow splitter 36 into two streams to flow around the duct 18 (FIG. 3) as two streams flowing in opposite directions. As the streams flow downstream around the duct 18 entrained water droplets and any other entrained liquid or solid substances tend to gravitate towards a lower portion of the stream, or collect on the wall of the duct 18 and drain downwardly, leaving entrained substance depleted steam to be swept by the gas deflectors 28 out of the duct 18 and upwardly across the underside of the perforated tray 60. The entrained substances which have gravitated to a lower portion of the duct 18, and are concentrated in a portion of the steam flowing along a lower portion of the duct 18, are swept by the entrained substance concentrate gas deflectors 30 downwardly into the liquid pool 70 (FIG. 1).

The gradual reduction in cross-section of the interior of the duct 18 in the direction of flow ensures a more even distribution of steam around the casing 1 with a consequent greater removal of entrained substance therefrom.

It will be seen in FIG. 1 that the assembly is immersed in the liquid pool 70, however, in other embodiments of the present invention, as shown chain dotted, the gas inlet 14 means and the assembly 16 are above the pool 70, and the assembly 16 only extends beneath the area covered by the perforated tray 60.

In other embodiments, as is well known in the art, the downcorner 68 terminates in a liquid trap and the assembly 16 extend underneath the trap.

In other embodiments of the present invention the top wall 40 (FIG. 3) of the duct 18 may be sloped so that any entrained substances collecting thereon drain away from the gas deflectors 28 towards the wall of the column 1.

In other embodiments of the present invention, the base wall 38 of the duct 18 may be sloped so that any entrained substances collecting thereon will be drained towards the entrained substance concentrate gas outlets 24 and deflectors 30.

In other embodiments of the present invention, the base wall 38 may, as shown chain dotted in FIG. 3, extend around the whole length of the duct 18.

In yet other embodiments of the present invention, the gas outlets 20 and the entrained substances concentrate gas outlets 24 increase in cross-sectional area in the downstream direction to more evenly distribute the flows from them into the lower, liquid collecting section 6.

Figure 4:
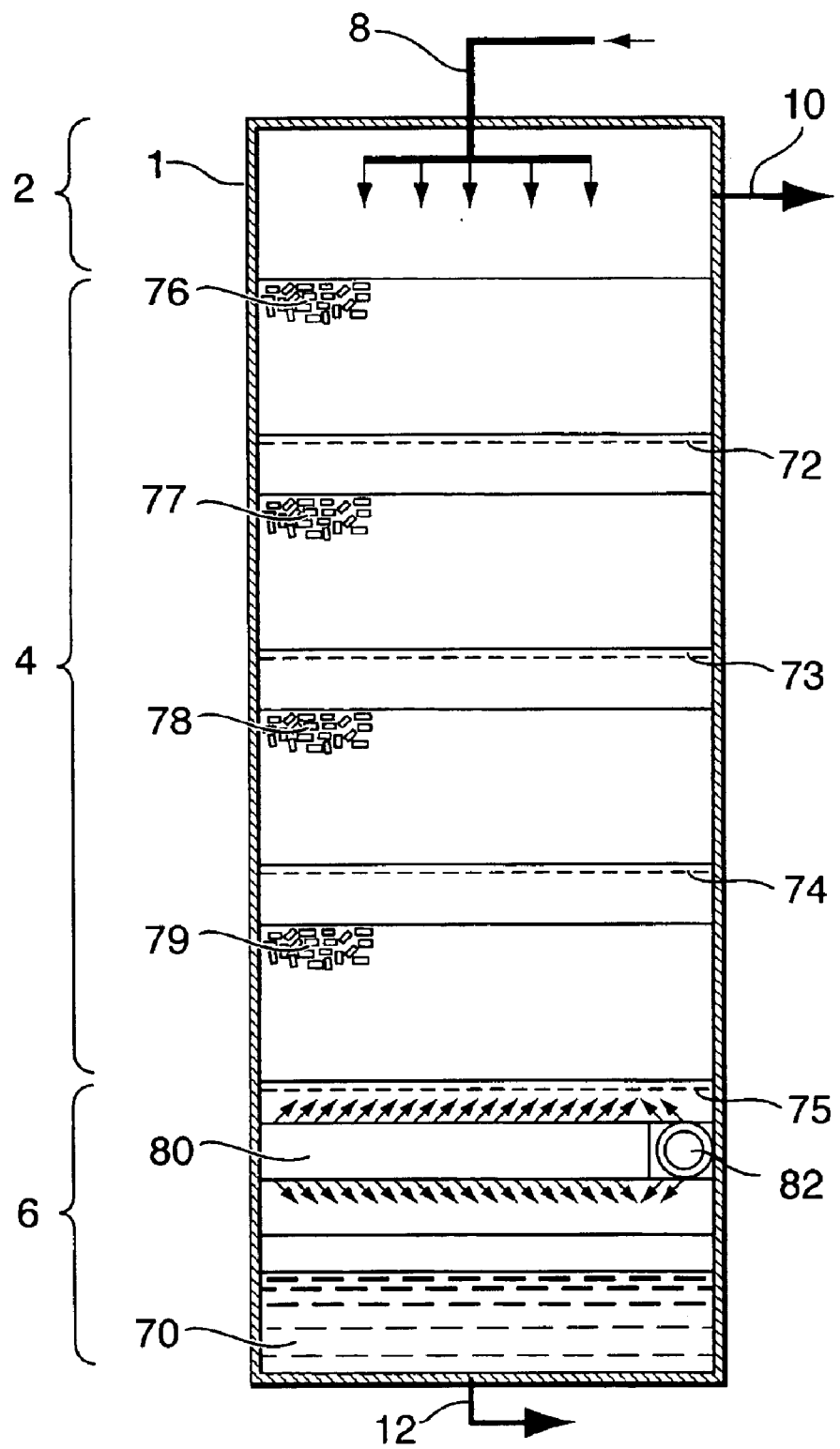
FIG. 4 is a schematic side view of a different gas/liquid contacting to that shown in FIG. 1.
Figure 5:
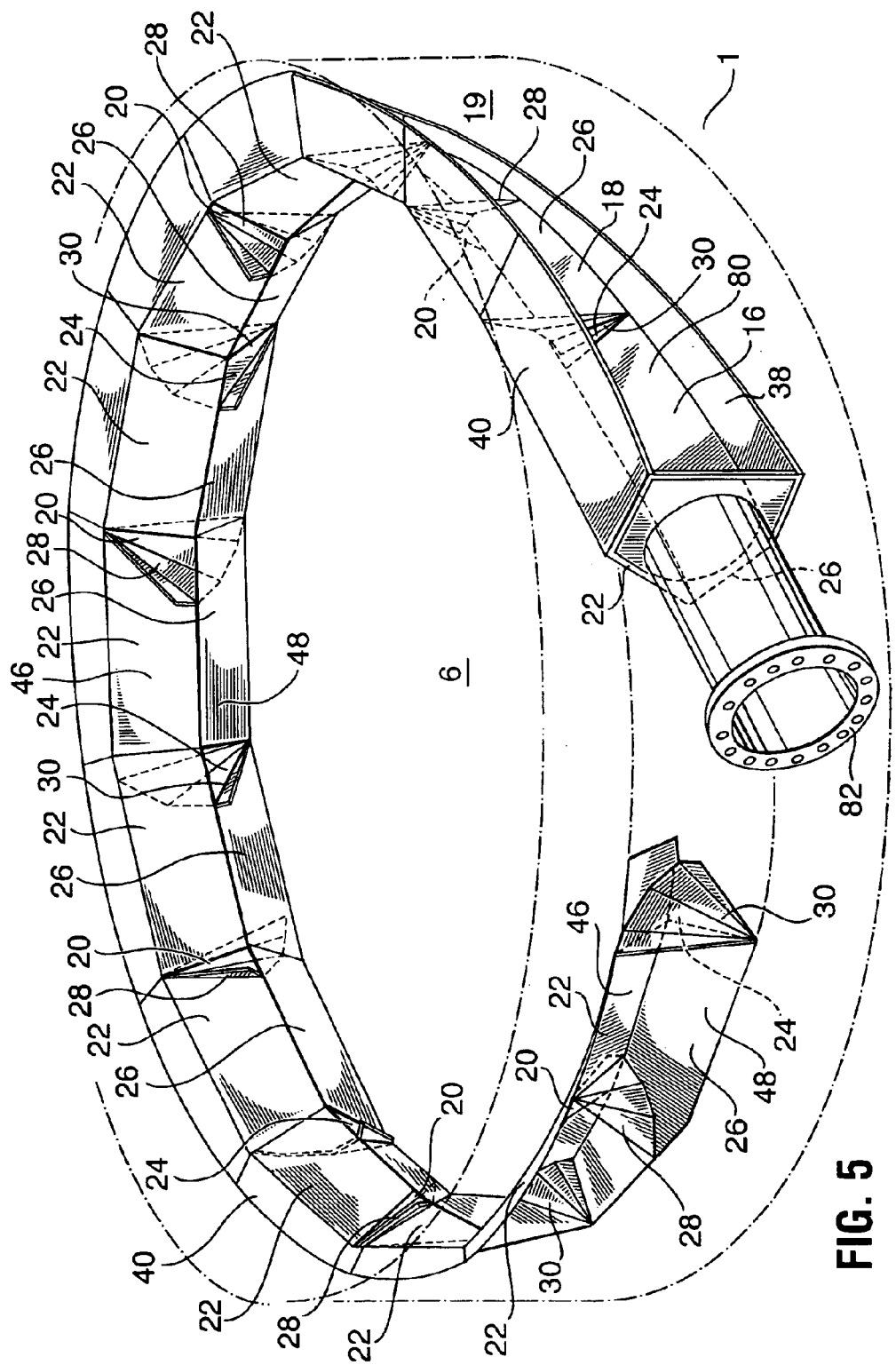
FIG. 5 is a perspective view of an entrained substance depleting, gas distributing assembly in the apparatus shown in FIG. 4.

In FIGS. 4 and 5, similar parts to those shown in FIGS. 1 to 3 are designated by the same reference numerals and the previous description is relied upon to describe them.

In FIG. 4, the gas/liquid permeable, gas/liquid contacting section 4 comprises perforated trays 72 to 75 and packed beds 76 to 70. The packed beds 76 to 79 may be, for example, catalyst packed beds or absorbent, or absorbent, packed beds capable of regeneration.

The entrained substance depleting, gas distributing assembly, generally designated 80 is connected to a gas inlet 82 of a cylindrical column 1, and feeds the gas tangentially into the column 1.

In FIG. 5, the duct 18 extends along a circular path and above the liquid pool 70, but in other respects is similar to the duct 18 of FIG. 3.

The gas distributing assembly 80 functions in the same manner as that described with reference to FIGS. 1 to 3, described with reference to FIG. 1 to 3. However, in this embodiment of the present invention liquid permeates downwardly through the packed beds 76 to 79, while gas passes upwardly through them.

In other embodiments, when the assembly 16 is not immersed in liquid, the gas deflectors 28 are only attached to downstream sides of the upwardly extending plates 48, with gaps between them and the next plate 48. The entrained substance, gas deflectors 30 are only attached to downstream sides of the downwardly extending plates 46, with gaps between them and the next plate 46. These gaps will cause pressure drops behind the gas deflectors 28 and the entrained substance, gas deflectors 30 which deflect the gas flow along the duct 18 either upwardly towards the next gas outlet 20, or downwardly towards next entrained substance, gas outlet 24.

Preferably, the entrained substance depleted gas outlets 20 are gas flow constricting gas outlets to enhance distribution of the depleted gas in the lower Section C.

Preferably, the entrained substance concentrate gas outlets 24 are gas flow constricting gas outlets to enhance removal of entrained substance from the duct 18.

We claim:

1. A gas/liquid contacting apparatus, comprising,
   a) an upwardly extending column having an interior comprising, an upper section, a gas/liquid permeable, gas/liquid contacting, intermediate section, and a lower, liquid collecting section,
   b) liquid inlet means to, and gas outlet means from, the upper section,
   c) liquid outlet means from, and gas inlet means to, the lower section, and
   d) an entrained substance depleting, gas distributing assembly in the lower section, the assembly comprising,
      i) a gas conveying duct connected to the gas inlet and having an interior that decreases in cross section downstream from the gas inlet, the duct extending around at least a major portion of the lower section, and having entrained substance depleted gas outlets, at spaced positions therealong, from inner, upwardly extending upper wall portions thereof, and entrained substance concentrate gas outlets, at spaced positions therealong, from inner, downwardly extending lower wall portions thereof, and
      ii) for each entrained substance depleted gas outlet, an entrained substance depleted gas deflector for directing gas flow from that gas outlet inwardly and upwardly in the lower section, and
      iii) for each entrained substance concentrate gas outlet an entrained substance concentrate gas deflector for directing entrained substance containing gas flow from the entrained substance concentrate gas outlet towards a lower portion of the lower section.

2. An apparatus as claimed in claim 1, wherein the entrained substance concentrate gas outlets are spaced along the duct at positions between the entrained substance depleted gas outlets.

3. Apparatus as claimed in claim 1, wherein the gas conveying duct is divided into two lengthwise extending portions by being connected at an intermediate position therealong to the gas inlet, with the duct interior decreasing in cross-section in both duct portions from the gas inlet, and the entrained substance depleting, gas distributing assembly further comprises a flow splitter for splitting the flow of gas entering the duct into gas streams for both duct portions.

4. Apparatus according to claim 1, wherein the gas conveying duct comprises a base wall extending inwardly from, and around, at least a portion of an inner side of the column, a top wall spaced above the base wall and extending inwardly from and around, the inner side of the column, with the inner, upwardly extending wall portion inclining downwardly from an inner edge of the top wall, towards the center of the lower section, and the inner, downwardly extending wall portion inclining upwardly from the level of the base wall to a lower edge of the inner, upper wall portion.

5. Apparatus according to claim 4, wherein the inner, upwardly extending wall portion comprises a series of plates with inverted V-shaped gaps between adjacent plates forming the entrained substance depleted gas outlets, and the inner, downwardly extending wall portion comprises a series of plates with V-shaped gaps between adjacent plates forming the entrained substance concentrate gas outlets.

6. Apparatus according to claim 4, wherein each entrained substance depleted gas deflector comprises an upwardly extending triangular plate joined by an upper sloping side to an upstream side of an inner, upwardly extending wall portion, and by a lower sloping side to a downstream side of an inner, downwardly extending wall portion and each entrained substance concentrate gas deflector comprises an upwardly extending triangular plate joined by an upper sloping side to a downstream side of an inner, upwardly extending wall portion and by a lower sloping side wall to an upstream side of an inner, downwardly extending wall portion.

7. Apparatus according to claim 1, wherein the entrained substance depleted gas deflectors and the entrained substance concentrate gas deflectors are curved to sweep entrained substance depleted gas or entrained substance concentrate gas towards their respective outlets.

8. Apparatus according to claim 1, wherein the duct extends along a circular path.

9. Apparatus according to claim 1, wherein the entrained substance depleted gas outlets and the entrained substance concentrate gas outlets are gas flow constricting outlets.

* * * * *